(12) United States Patent
Chambers

(10) Patent No.: US 6,230,298 B1
(45) Date of Patent: May 8, 2001

(54) DIGITAL MESSAGING METHOD AND APPARATUS

(75) Inventor: Charles Chambers, Cambridge (GB)

(73) Assignee: ICO Services LTD, London (GB)

( * ) Notice: Subject to any disclaimer, the term of this patent is extended or adjusted under 35 U.S.C. 154(b) by 0 days.

(21) Appl. No.: 09/010,143

(22) Filed: Jan. 21, 1998

(30) Foreign Application Priority Data

Jan. 21, 1997 (GB) .................................................. 9701139

(51) Int. Cl.[7] .................................................. H03M 13/00
(52) U.S. Cl. .................................................. 714/781; 714/756
(58) Field of Search .................................................. 714/781, 756; 370/529

(56) References Cited

U.S. PATENT DOCUMENTS

| | | | |
|---|---|---|---|
| 3,873,920 | * 3/1975 | Apple, Jr. et al. | 714/775 |
| 4,320,511 | * 3/1982 | Koga et al. | 714/779 |
| 4,899,340 | * 2/1990 | Lubarsky | 714/759 |
| 5,103,451 | * 4/1992 | Fossey | 714/781 |
| 5,109,385 | * 4/1992 | Karp et al. | 714/775 |
| 5,140,596 | * 8/1992 | Weldon, Jr. | 714/762 |
| 5,224,106 | * 6/1993 | Weng | 714/755 |
| 5,282,214 | * 1/1994 | Dravida | 714/757 |
| 5,307,355 | * 4/1994 | Lauck et al. | 714/781 |
| 5,309,449 | * 5/1994 | Gandini et al. | 714/781 |
| 5,402,429 | * 3/1995 | Stessens | 714/781 |
| 5,442,625 | 8/1995 | Gitlin et al. | 370/342 |
| 5,465,260 | * 11/1995 | Zook | 714/758 |
| 5,790,568 | * 8/1998 | Luong et al. | 714/781 |
| 5,949,796 | * 9/1999 | Kumar | 370/529 |
| 5,955,959 | * 9/1999 | Taki et al. | 340/825.14 |

FOREIGN PATENT DOCUMENTS

| | | | |
|---|---|---|---|
| 0-748-062 | 12/1996 | (EP) | H04B/7/185 |
| 1-505-228 | 3/1978 | (GB) | H04L/1/16 |
| 96-19879 | 6/1996 | (WO) | H04B/7/216 |

OTHER PUBLICATIONS

Kagaris et al.(A Class of Good Characteristics Polynomials For LFSR Test Pattern Generators. IEEE, Oct. 1994).*
Heegard(Constellation Shaping for the Gaussian Channel. IEEE, Sep. 1995).*

* cited by examiner

*Primary Examiner*—Albert Decady
*Assistant Examiner*—Guy Lamarre
(74) *Attorney, Agent, or Firm*—McDermott, Will & Emery

(57) ABSTRACT

In a preferred satellite (3) communications environment, spread spectrum communications, under extremes of digital message readability, is established for a digital message 23 by division into smaller elements W(0)–W(C−1) which are transmitted in turn, each multiplied for logical inversion or non-inversion, by the individual, sequential digits of a preferred binary polynomial 35, being either a PN polynomial, an m-polynomial, or simply displaying alternate logical ones and zeroes. The preferred polynomial may be used convey an alternative polynomial for better reception of a subsequent digital message.

29 Claims, 7 Drawing Sheets

DIGITAL MESSAGING METHOD AND APPARATUS

FIELD OF THE INVENTION

The present invention relates to a system and method for the transmission and reception of digital messages. The invention particularly relates to a system and method employing a telecommunications link. In greatest particularity, the present invention relates to a system and method for conveying messages in satellite communications.

BACKGROUND OF THE INVENTION

Digital Messages comprise a sequence of binary digits conveying information. The binary digits are transmitted, in sequence, and received in sequence, to reconstruct the original digital message.

Digital Messages are extensively used for conveying data from one point to another. The digital message is modulated onto a carrier frequency which is then conveyed by a telecommunications channel to the receiving point where the modulated carrier is demodulated to recover the original digital message.

While transmission via, cable and telephone lines is generally of high quality and requires no particular sophistication beyond that already stated, many situations exist where the viability of the communications link is marginal and where the digital message must be conveyed under circumstances which are less than ideal.

One such environment is in satellite communications. A user terminal, perhaps in the form of a telephone handset, is in radio contact with a satellite which, in turn, conveys messages to and from the user terminal respectively from and to an earth station. There are circumstances where the satellite finds difficulty in establishing radio contact with the user terminal. The user terminal may be shielded by buildings, locked within a motor vehicle or in a desk, or unavailable for a host of other reasons. None the less, it is a function of a satellite communications system periodically to poll user terminals to determine their location or to instruct the user terminal to re-register with the satellite communication system as soon as radio contact with the satellite can be established. In order to achieve this purpose, the satellite sends a digital message, to the user terminal, at higher power than would be employed in normal communications. This is known as high power notification. There is a limit to the amount of power that a satellite can devote to attempting to poll a particular user terminal. While it is desirable to use as much available power as one can, there is a limit. Another approach is to use the available bandwidth to best effect and to ensure and improve the reliability of the decoding of the digital message.

SUMMARY OF THE INVENTION

The present invention does not concern itself with the particular contents of a digital message. The invention is directed solely towards ensuring that the available bandwidth and decoding capacity are used to best advantage.

When sending a digital message, especially a short digital message as is desirable when using limited high power, there is a problem that a true spread spectrum signal is not generated. A spread spectrum signal best utilises the available bandwidth. However, short recursive messages tend to produce spectral peaks such that the signal transmitted, instead of appearing to have a largely flat spectrum across the available bandwidth, as is desirable with a true spread spectrum system, exhibits, instead, a finite number of spectral peaks which fail best to utilise the available bandwidth.

The present invention concerns itself with a method and system for sending digital messages, particularly short digital messages, while avoiding the generation of spectral peaks and while adapting the spectrum of the digital message to be closer to the ideal, flat spread spectrum.

According to a first aspect, the present invention consists in a method for transmitting a digital message, said digital message comprising an ordered sequence of binary message digits, said method including the steps of: rearranging said ordered sequence of binary message digits into a re-ordered sequence where no binary message digit in said re-ordered sequence is adjacent to any binary message digit whereto it was adjacent in said ordered sequence; dividing said re-ordered sequence into a plurality of smaller elements; selecting each of said smaller elements, in turn; and repeatedly transmitting each selected smaller element, according to the sequentially ordered digits of a preferred binary polynomial, selecting each ordered binary digit in said binary polynomial in turn, and selectively, as an ordered sequence of binary signals, transmitting either the logically uninverted form or the logically inverted form of the selected smaller element according to the logical polarity of the selected digit of the binary polynomial, until each ordered binary digit of the binary polynomial has been selected.

According to a second aspect, the present invention consists in a method for receiving a digital message, for use in conjunction with the first aspect of the invention, including the steps of; receiving said sequence of binary signals; employing the sequence of binary terms of said preferred polynomial to separate said sequence of binary signals into a plurality of supposedly identical smaller elements; correcting any errors between said plurality of supposedly identical smaller elements to create a corrected smaller element; assembling all of said plurality of smaller elements as a plurality of said smaller corrected elements into said re-ordered sequence; and deriving said ordered sequence from said re-ordered sequence.

According to a third aspect, the present invention consists in an apparatus for transmitting a digital message, said digital message comprising an ordered sequence of binary message digits, apparatus being operative to rearrange said ordered sequence of binary message digits into a re-ordered sequence where no binary message digit in said re-ordered sequence is adjacent to any binary message digit whereto it was adjacent in said ordered sequence; wherein said apparatus is operative to divide said re-ordered sequence into a plurality of smaller elements; wherein said apparatus is operative to select each of said smaller elements, in turn; and repeatedly to transmit each selected smaller element, according to the sequentially ordered digits of a preferred binary polynomial, selecting each ordered binary digit in said binary polynomial in turn, and selectively, as an ordered sequence of binary signals, transmitting either the logically uninverted form or the logically inverted form of the selected smaller element according to the logical polarity of the selected digit of the binary polynomial, until each ordered binary digit of the binary polynomial has been selected.

According to a fourth aspect, the present invention consists in an apparatus for receiving a digital message, for use in conjunction with apparatus according to the third aspect, operative to receive said sequence of binary signals; operative to employ the sequence of binary terms of said preferred polynomial to separate said sequence of binary signals into a plurality of supposedly identical smaller elements; operative to correct any errors between said plurality of supposedly identical smaller elements to create a corrected smaller element; operative to assemble all of said plurality of smaller elements as a plurality of said smaller corrected elements into said re-ordered sequence; and operative to deriving said ordered sequence from said re-ordered sequence.

The apparatus may be operative to rearrange said ordered sequence of binary message digits by assembling said ordered binary digits as the sequential elements of sequential rows of a matrix and by taking the ordered elements of sequential columns of said matrix as said re-ordered sequence. The apparatus may take, as said smaller elements, the sequences of said message binary digits in each of said columns of said matrix. The preferred binary polynomial may be a PN sequence or an m-sequence or an alternating binary digits of mutually inverse logical polarity.

The apparatus may be operative to employ, as said digital message a first digital message, indicative of an alternative binary polynomial, operative to transmit said first digital message using said preferred polynomial, and, thereafter, operative to transmit said second binary message using said alternative binary polynomial.

The alternative binary polynomial may a selectable one from a predetermined plurality of alternative binary polynomials. The alternative binary polynomial may be a PN sequence, an m-sequence or alternating binary digits of mutually inverse logical polarity.

According to a fifth aspect, the present invention consists in a method for communicating a digital message, said digital message comprising an ordered sequence of binary message digits, said method including the steps of: rearranging said ordered sequence of binary message digits into a re-ordered sequence where no binary message digit in said re-ordered sequence is adjacent to any binary message digit whereto it was adjacent in said ordered sequence; dividing said re-ordered,sequence into a plurality of smaller elements; selecting each of said smaller elements, in turn; and repeatedly transmitting each selected smaller element, according to the sequentially ordered digits of a preferred binary polynomial, selecting each ordered binary digit in said binary polynomial in turn, and selectively, as an ordered sequence of binary signals, transmitting either the logically uninverted form or the logically inverted form of the selected smaller element according to the logical polarity of the selected digit of the binary polynomial, until each ordered binary digit of the binary polynomial has been selected.

According to a sixth aspect, the present invention consists in an apparatus for communicating a digital message, said digital message comprising an ordered sequence of binary message digits, said apparatus being operative to rearrange said ordered sequence of binary message digits into a re-ordered sequence where no binary message digit in said re-ordered sequence is adjacent to any binary message digit whereto it was adjacent in said ordered sequence; wherein said apparatus is operative to divide said re-ordered sequence into a plurality of smaller elements; wherein said apparatus is operative to select each of said smaller elements, in turn; and repeatedly to transmit each selected smaller element, according to the sequentially ordered digits of a preferred binary polynomial, selecting each ordered binary digit in said binary polynomial in turn, and selectively, as an ordered sequence of binary signals, transmitting either the logically uninverted form or the logically inverted form of the selected smaller element according to the logical polarity of the selected digit of the binary polynomial, until each ordered binary digit of the binary polynomial has been selected.

According to a seventh aspect, the present invention consists in a transmittable message, for conveyance by medium for conveying a digital message, said transmittable message being prepared from a digital message comprising an ordered sequence of binary message digits, said transmittable message being prepared by a method including the steps of: rearranging said ordered sequence of binary message digits into a re-ordered sequence where no binary message digit in said re-ordered sequence is adjacent to any binary message digit whereto it was adjacent in said ordered sequence; dividing said re-ordered sequence into a plurality of smaller elements; selecting each of said smaller elements, in turn; and repeatedly transmitting each selected smaller element, according to the sequentially ordered digits of a preferred binary polynomial, selecting each ordered binary digit in said binary polynomial in turn, and selectively, as an ordered sequence of binary signals, transmitting either the logically uninverted form or the logically inverted form of the selected smaller element according to the logical polarity of the selected digit of the binary polynomial, until each ordered binary digit of the binary polynomial has been selected.

All of the aspects of the present invention further provide that said rearranging of said ordered sequence of binary message digits includes the steps of or means for assembling said ordered binary digits as the sequential elements of sequential rows of a matrix and taking the ordered elements of sequential columns of said matrix as said re-ordered sequence.

All of the aspects of the present invention further provide that said smaller elements are the sequences of said message binary digits in each of said columns of said matrix.

All of the aspects of the present invention yet further provide that said preferred binary polynomial is a PN sequence, an m-sequence or comprises alternating binary digits of mutually inverse logical polarity.

All of the aspects of the invention further provide that said digital message comprises a first digital message, indicative of an alternative binary polynomial, to be transmitted said using said preferred polynomial, and, and a second binary message, thereafter, transmitted using said using said alternative binary polynomial.

All of the aspects of the invention further provide that said alternative binary polynomial is a selectable one from a predetermined plurality of alternative binary polynomials.

All of the aspects of the invention further provide that said alternative binary polynomial is a PN sequence, an m-sequence or comprises alternating binary digits of mutually inverse logical polarity.

The second, fourth, fifth and sixth aspects of the invention provide that said smaller elements are the sequences of said message binary digits in each of said columns of said matrix.

The second, fourth, fifth and sixth aspects of the invention further provide that said digital message comprises a first digital message, indicative of an alternative binary polynomial, and a second digital message and that recovery said first digital message involves using said preferred polynomial to operate upon said first binary message, as transmitted, recognizing said alternative binary polynomial and, thereafter, recovering said second binary message using said alternative binary polynomial.

The second, fourth, fifth and sixth aspects of the invention further provide that said alternative binary polynomial is a selectable one from a predetermined plurality of alternative binary polynomials.

The first to sixth aspects of the invention provide a method or apparatus for use with satellite communications.

The seventh aspect of the invention provides that the medium comprises a satellite communications channel.

While it is preferred that the medium comprises a satellite communications channel, the invention also provides that the medium can include any type of radio, wire, cable, light, acoustic, ultrasonic or other channel where marginal communications conditions may prevail. In addition, the method and apparatus can be employed in the storage of any digital signals where noise degradation can be a problem, such storage means including magnetic and optical discs, and integrated circuit memories, where poor signal-to-noise ratio can build up over data storage time, the data storage means becoming the medium of the present invention, equivalent to the communications channel.

BRIEF DESCRIPTION OF THE DRAWINGS

The present invention is further described, by way of an example, by the following description, in conjunction with the appended drawings, in which.

DETAILED DESCRIPTION OF THE INVENTION

Figure 1:
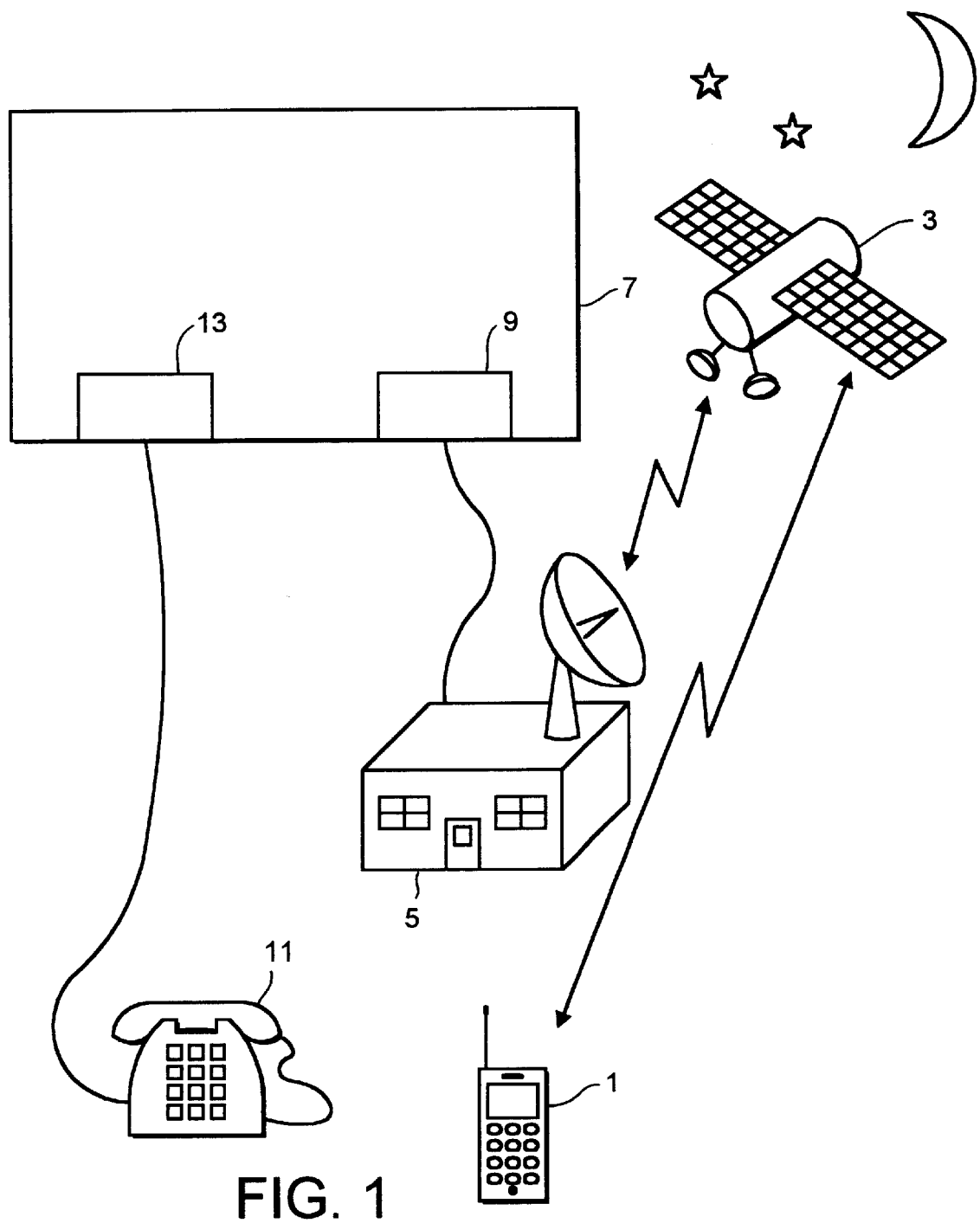
FIG. 1 shows a generic satellite communications system, in terms of which the preferred, but not exclusive, embodiment of the invention is described.

Attention is first drawn to FIG. 1.

FIG. 1 is a diagram of the generic communications system in which satellite communications are employed.

A user terminal, in the form of a handset 1, is in bi-directional contact with a satellite 3 which, in turn, is in bi-directional radio contact with a satellite earth station 5. The satellite earth station 5 communicates with the terrestrial telephone system 7 via a satellite gateway 9. The terrestrial telephone system 7, shown in the most general schematic form in FIG. 1, includes all of the telephone lines, exchanges, switches, microwave links, fibre optic links etc. that can be joined together in the world to establish communications channels. Equally, an ordinary telephone may have, as its gateway, a public switched telephone network 13 which can communicated through the terrestrial system, if so desired, via the satellite gateway 9 to communicate with the handset 1.

Periodically, the satellite earth station 5 will, via the satellite 3, poll the handset 1 which responds so that the satellite earth station 5 may know that the handset 1 is present and also knows the approximate location of the handset 1.

Figure 2:
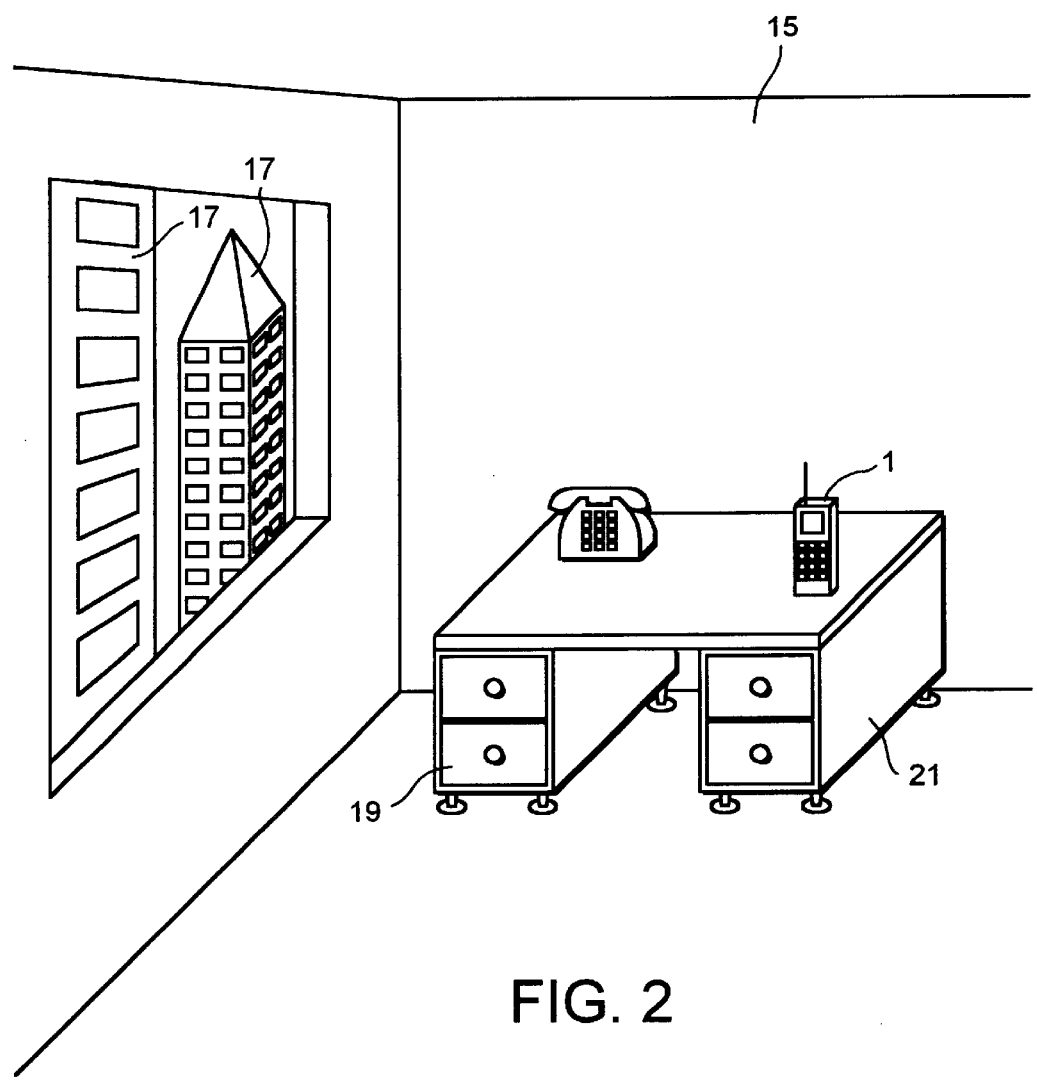
FIG. 2 shows situations where communication, in the system of FIG. 1, can be marginal.

FIG. 2 shows the situation where the handset one may be in a building 15 which, in turn, is shielded by other tall buildings 17. Direct radio contact with the satellite 3 may be difficult or impossible for even this simple situation. Equally, the handset could be locked in the drawer 19 of the desk 21 and be further shielded. Even worse, the handset may be situated in a basement, tunnel or mine. While it is not always possible for the satellite 3, using higher power, to contact the handset 1, it is still desirable that the best attempt possible be made to overcome the natural radio obstacles indicated in relation to FIG. 2 to maximise the chance of the satellite 3 communicating with the handset 1.

Figure 3:
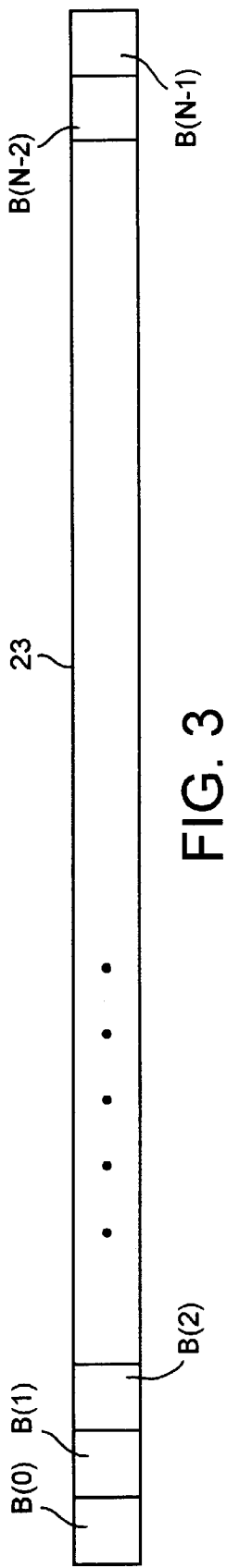
FIG. 3 shows a generic digital message.

FIG. 3 illustrates a message which the satellite earth station 5 might wish to send to the handset 1. The exact content of the message is not a matter for the present invention. It is sufficient that the message exists.

A sequence of binary digits $B(0)$ to $B(N-1)$ form a digital message 23 which is N bits long. This may be a repetition of a single shorter message or a complete message on its own. It is of no consequences to the present invention.

Figure 4:
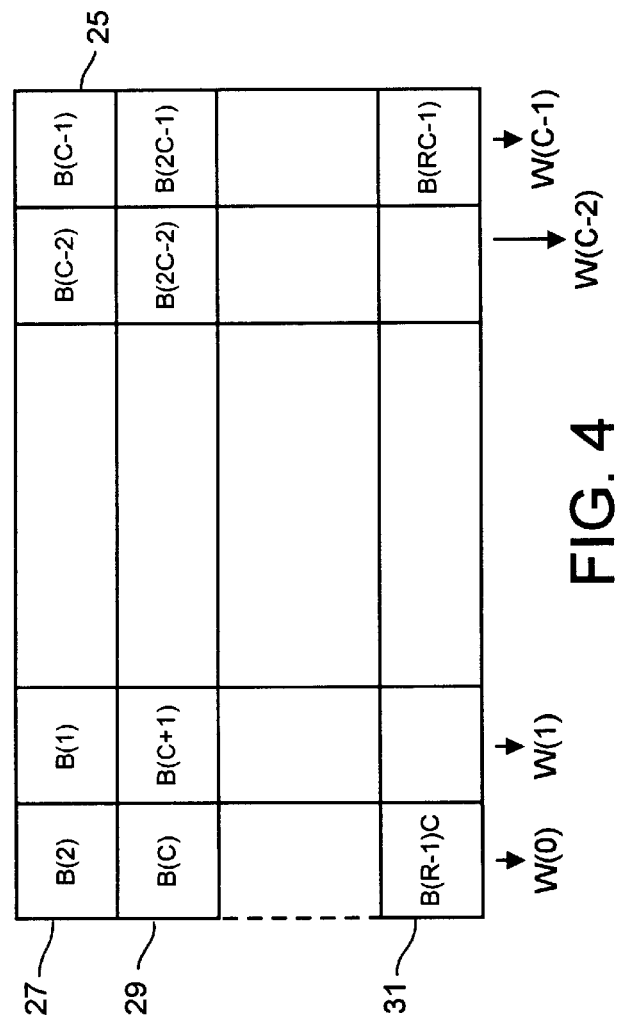
FIG. 4 shows assembly of the digital message of FIG. 3 into a matrix to create smaller elements in the form of words.

FIG. 4 shows the table method whereby the digital message 23 of FIG. 3 is broken up to eliminate the recursive elements which cause spectral peaks during transmissions.

The digital message 23 is distributed in a matrix 25 comprising R row of C columns with the binary digits $B(0)$ to $B(N-1)$ distributed as indicated, commencing with the beginning of the first row 27, and when the first row 27 is full, commencing again at the first position of the second row 29 and so continuing until the last row 31 is full. If there are more positions in the matrix than there are binary digits $B(0)0$ to $B(N-1)$ in the digital message 23, fill characters such as repeated binary 1 or binary 0, or some other desired character pattern, may be added to the beginning or the end of the digital message such that the total number of binary digits $B(0)$ to $B(N-1)$ equals the number RC of locations in the matrix 25.

Having assembled the digital message 23 in the matrix 25 as indicated in FIG. 4, the digital message 23 is reassembled into words $W(0)$ to $W(C-1)$, as shown in FIG. 4. During transmission, the words $W(0)$ to $W(C-1)$, there being C words, are taken in sequence for transmission, but not before a further process to establish an approximation to a spread spectrum.

Figure 5:
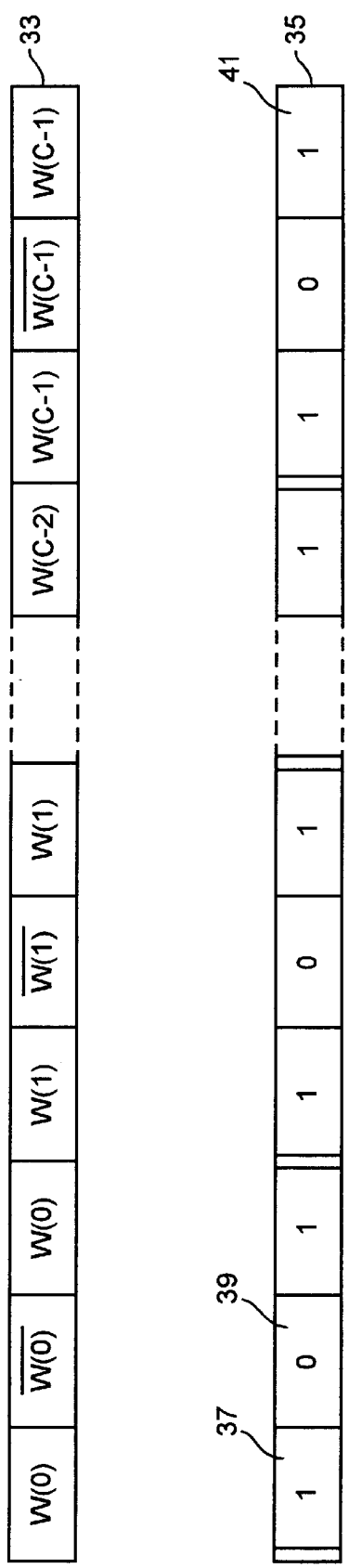
FIG. 5 shows the manner in which the transmitted signal is assembled using successive multiplication of words, the smaller elements of FIG. 4, by successive terms of a polynomial, taking each smaller element or word in turn.

FIG. 5 shows how the individual words $W(0)$ to $W(C-1)$ are multiplied by a polynomial which has a auto correlation function and a low correlation function further to spread the spectrum of the transmission. The top row 33 shows how each of the words $W(0)$ to $W(C-1)$ is selected in turn. The bottom row 35 shows how a low polynomial with a high autocorrelation peak and low correlation sidelobes, chosen, in this example, to be the 3 term polynomial 101, is used to multiply each word. The first word W(0) is first multiplied by the leading term 37 of the polynomial. If a term in the polynomial is 1, the word W(0) is transmitted uninverted. If the term in the polynomial is a zero, the word W(0) is inverted. Having transmitted the first word W(0) uninverted, the second term 39 of the polynomial is selected and again used to multiply the word W(0) this time inducing the logically inverted form where all one's become zero's and all zero's become one's. This process continues until all of the terms 37, 39 etc. of the polynomial have been used up. Then, the next word W(1) is selected and the process repeated. As each word W(n) is taken in order and multiplied by the entirety of the terms 37,39 etc., one by one, in the polynomial, so the next word W(n+1) is selected until the final word W(C−1) has been multiplied by the final term 41 of the polynomial.

Those skilled in the art will be aware that other polynomials than the ones selected may be used as the multiplying polynomial and that the length of the polynomial may be different from three elements.

The purpose of the polynomial is to provide a large repeat distance, that is, a low repetition rate to ensure that spectral peaks appear close together while, at the same time. keeping the coherent integration distance (2R) short.

It is preferred, in the embodiment of the invention here shown, that the polynomial is selected from the set of PN sequences, or m sequences, explained, as will be well known to those, skilled in the art, in "Digital Communication", second edition, ISBN 0-07-100269-3, by John G. Proakis, published in 1989 by McGraw-Hill. Those skilled in the art will be aware that other polynomials will be capable of fulfilling the stated purpose.

Figure 6:
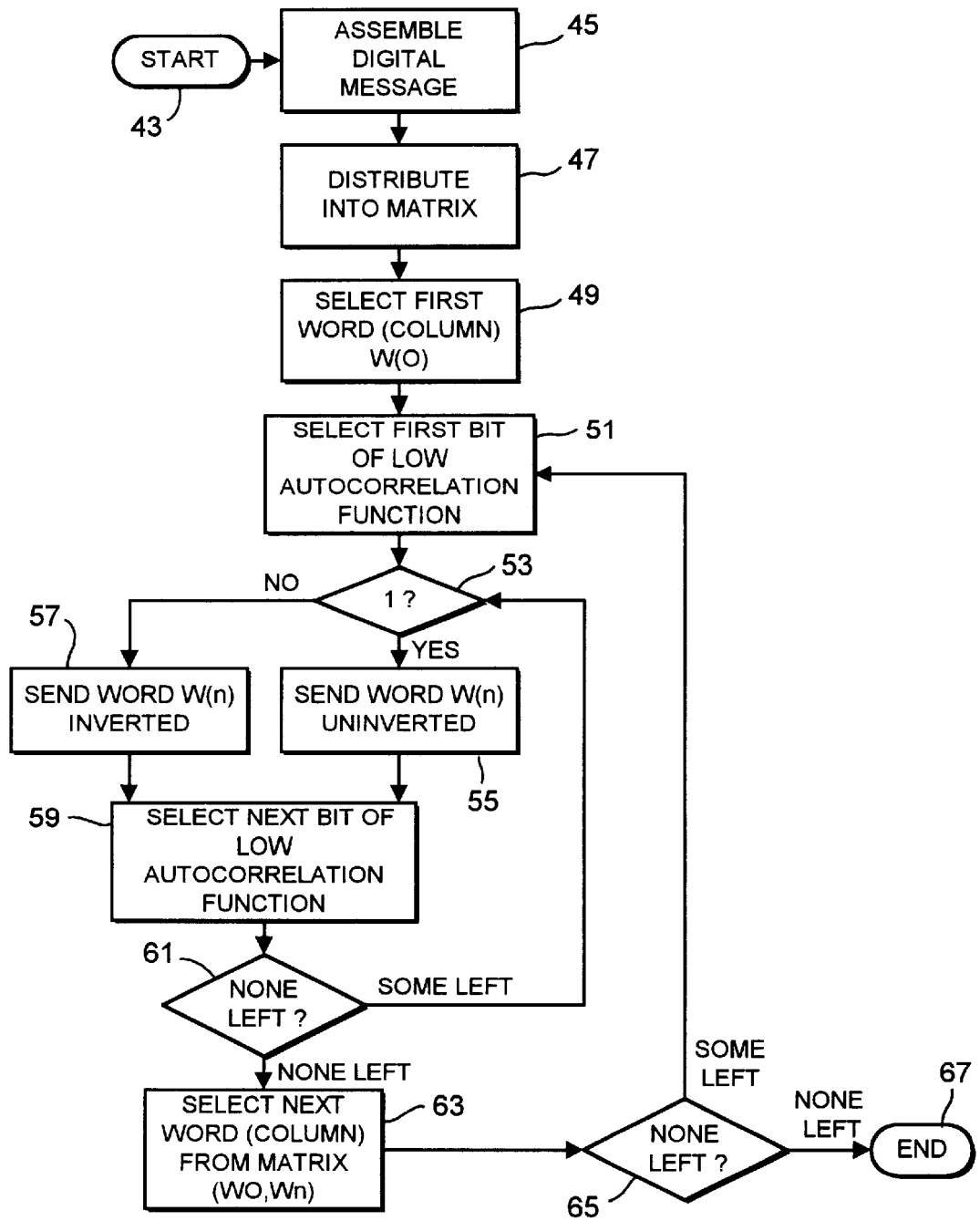
FIG. 6 is a flow chart showing the behaviour of the earth station of FIG. 1 when assembling and transmitting the digital message, according to the description and associated drawings of FIGS. 3 through 5.

FIG. 6 is a flow chart showing the activity of the satellite earth station 5 when sending a digital message 23 in the manner here and before described.

Entry 43 is to a first operation 45 where the satellite earth station 5 assembles the necessary digital message 23 to be sent to the handset one. The particular digital message 23 will depend upon many factors and its nature and content is outside the scope of the description of the present invention.

Having assembledthe digital message 23, control then passes to a second operation 47 where the digital message 23 is assembled into the matrix 25 as described with reference to FIG. 4.

Control next passes to a third operation 49 where the satellite earth station 5 selects the first word W(0) as shown in FIG. 4. Control then passes to a fifth operation 51 where the first term 37 of the polynomial is selected. Control then passes to a first test 53 which checks to see whether the selected polynomial term 37, 39, 41 is a one or a zero. If the selected polynomial term 37, 39, 41 is logical one, control passes to a fifth operation 55 where the satellite earth station 5 sends the selected word W(n) in a non inverted form, binary digit B(n) by binary digit B(n).

If the first test 53 detects that the selected term 37, 39, 41 of the polynomial is not logical one, in other words logical zero, control passes to a sixth operation 57 where the satellite earth station 5 sends the logical inverse of the selected word W(n).

Both the fifth operation 55 and the sixth operation 57 pass control to a seventh operation 59 where the satellite earth station 5 selects the next term 39 of the polynomial. A second test 61 checks to see if there are any terms left in the polynomial. If the last term 41 has been used, indicating that there are no terms left, control passes to an eighth operation 63 where the, satellite earth station 5 selects the next word W(n+1), as indicated with reference to the description of FIG. 5. A third test 65 checks to see whether or not there are any words W(n+1) remaining to be sent. If the last word W(C−1) has already been selected and sent, nothing else remains to be done and the process comes to an end 67. If the third test 65 determines that there are still remaining words W(n) remaining to be transmitted, it passes control back to the fourth operation 51 which begins by selecting the first term 37 of the polynomial ready to commence the multiplication and transmission process as already described with reference to FIGS. 5 and 6.

Figure 7:
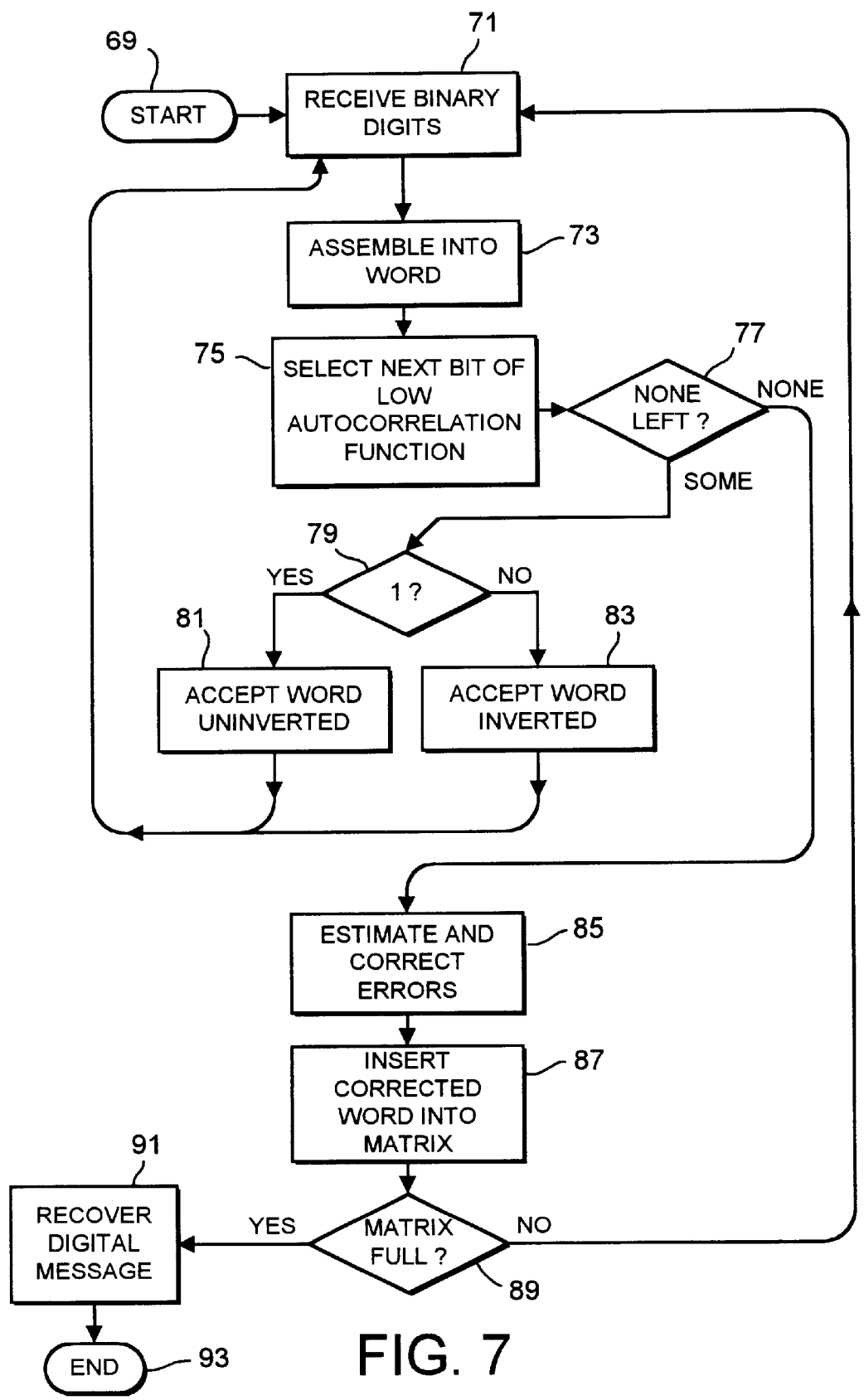
FIG. 7 is a flow chart showing the behaviour of the user terminal of FIG. 1 when receiving the digital message, transmitted according to FIG. 7 and its associated description.

FIG. 7 shows the activity of the handset 1 when receiving a message processed according to the forgoing description.

Entry 69 is to a ninth operation 71 where the handset 1 receives and re-modulates a stream of binary digits. Control passes to a tenth operation 73 where the handset 1 assembles the binary digit B(n) into the strength equal in length to a word W(n) thus illustrated in FIGS. 4 and 5.

Control next passes to an eleventh operation 75 where, the handset 1 knowing the polynomial 37, 39, 41, selects the next term 37, 39, 41 in the polynomial which has not already been selected. Control then passes a fourth test 77 which checks to see if there are any terms 37, 39, 41 remaining in the polynomial, in other words whether or not the last term 41 has or has not already been used.

If the fourth test 77 detects that remaining term 37, 39, 41 of the polynomial are yet to be used, control passes to a fifth test 79 which checks to see whether the selected term 37, 39, 41 is a logical one or a logical zero. If the fifth test 79 detects selected term 37, 39, 41 is a logical one, control passes to a twelfth operation 81 where the handset 1 accepts the word W(n) in its uninverted form. If the fifth test 79 detects that the selected term 37, 39, 41 is a logical zero, control passes to a thirteenth operation 83 where the handset 1 inverts the binary digits it has received and accepts the word W(n) in its inverted form.

Both the twelfth operation 81 and the thirteenth operation 83 continue until the entire polynomial has been employed on the received word. When the fourth test 77 detects that the final term 41 of the polynomial has already been selected, control passes to a fourteenth operation 85 where the handset 1 estimates and corrects errors in the received word. The exact manner of sole estimating and correcting is described here after in greater detail with reference to FIG. 8. Having estimated and corrected errors , the fourteenth operation 85 provides a corrected word W(n). Control then passes to a fifteenth operation 87 where the corrected word W(n) is inserted into its appropriate position in the matrix 25 so as to perform reconstruction of the matrix is shown in FIG. 4. A sixth test 89 checks to see if the matrix is full. If the matrix 25 is full, the entire digital message 23 has been received. Control passes to a sixteenth operation 91 where the hand set 1 disassembles the contents of the matrix 25 to reconstruct the digital message 23 as shown in FIG. 3. The sixteenth operation 91 being complete, this process comes to an end 93 and the handset 1 moves on to perform whatever other tasks are required of it, perhaps in response to the digital message 23.

If the sixth test 89 detects that the matrix is not full, that is to say that the final word W(C−1) has not yet been received, control passes back to the ninth operation 71 where the handset 1 continues to receive and reconstruct elements of the digital message 23.

Figure 8:
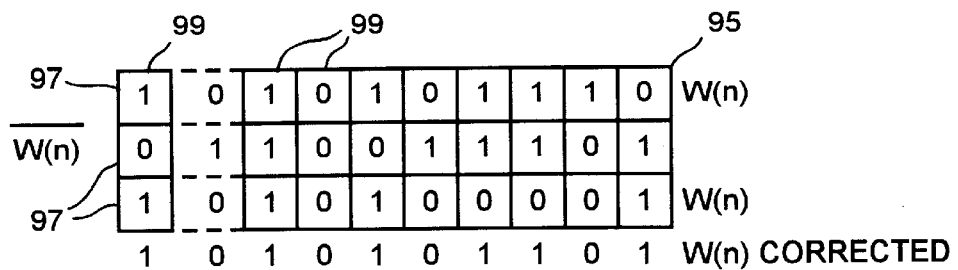
FIG. 8 shows one exemplary manner of generating the corrected word of FIG. 7.

FIG. 8 illustrates one way in which the fourteenth operation 85 can estimate and correct errors.

The received word W(n) is of a known length. The individually received words W(n) are fitted into a table 95 where individually received and, as necessary, inverted versions of the word W(n) are assembled one above the other in table rows so that, in theory, each table column 99 should contain entirely the same binary digits. Because of errors, some of the binary digits in the table 95 do not, match. However a majority decision is taken in each table column so that whichever form of binary digit, one or zero, is most frequent, is taken as the probable value of that table column to produce a corrected version of the word W(n). It is this value which is passed on to the fifteenth operation 87 for insertion into the matrix 25.

Those, skilled in the art, will be aware that the correction method shown in FIG. 8 is only an exemplary. The system may incorporate error correction codes, integration over several word periods, and so on.

Figure 9:
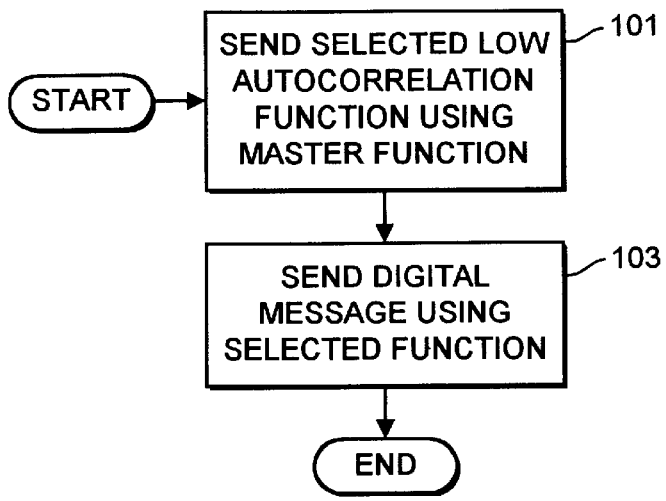
FIG. 9 is a flow chart showing the behaviour of the earth station of FIG. 1 when utilising the preferred polynomial of FIGS. 5, 6 and 7 to communicate an alternative polynomial to the user terminal of FIG. 1 for use in transferring a subsequent digital message.
Figure 10:
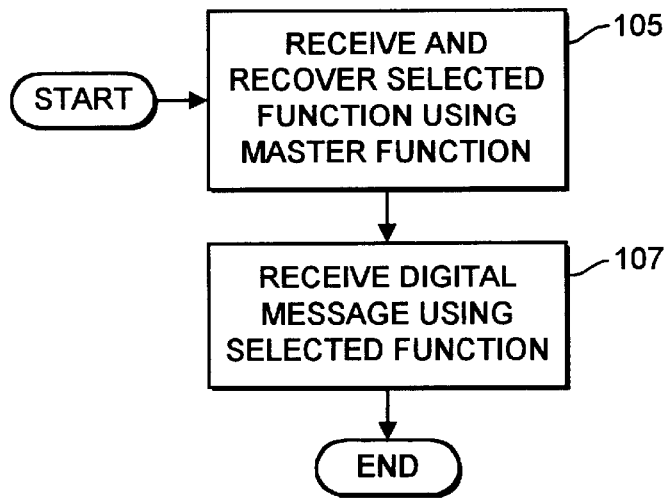
FIG. 10 is a flow chart of the behaviour of the user terminal of FIG. 1 when receiving a two-polynomial digital message according to FIG. 9.

FIGS. 9 and 10 show a variation where transmission may be possible under extremely adverse conditions. 4 FIG. 9 shows the behaviour of the satellite earth stations 5 and FIG. 10 shows the corresponding behaviour of the handset 1.

A seventeenth operation 101, in FIG. 9, shows the satellite earth station 5 using the method hereinbefore described, to send, to the handset 1, a binary message 23 which contains or names a better polynomial for use in sending a later proper digital message 23. The satellite earth station 5, in the seventeenth operation 101, may send many repetitions of the selected polynomial function, or a short identifier, representative of one of a plurality of selectable polynomials, so that the probability of the handset 1 identifying the selected polynomial function is increased. Once the seventeenth operation 101 is over, an eighteenth operation 103 shows the satellite earth station 5 sending the more complex true digital message 23 using the more elaborate and effective polynomial function.

FIG. 10 is a simple mirror of FIG. 9, where the handset 1, in a nineteenth operation 105, receives either the selected polynomial function or an indication thereof, for selection from a known list, as transmitted by the satellite earth station in the seventeenth operation 101, and then goes on, in a twentieth operation 107, to receive the true digital message 23 using the selected polynomial function.

The seventeenth operation 101 may not be restricted to sending simply a polynomial function, or an indication of a polynomial function to be selected from a list stored in the handset 1. It may also indicate the dimensions of the matrix 25 which the handset 1 should use.

By lending such flexibility to the system, the probability of communications is enhanced in even more harsh conditions of signal loss.

What is claimed is:

1. The method for communicating a digital message, said digital message comprising an ordered sequence of binary message digits, said method comprising the steps of: rearranging said ordered sequence of binary message digits into a re-ordered sequence where no binary message digit in said re-ordered sequence is adjacent to any binary message digit whereto it was adjacent in said ordered sequence; dividing said re-ordered sequence into a plurality of smaller elements; selecting each of said smaller elements, in turn; and repeatedly transmitting each selected smaller element, according to sequentially ordered digits of a preferred binary polynomial, selecting each ordered binary digit in said binary polynomial in turn, and selectively, as an ordered sequence of binary signals, transmitting either the logically uninverted form or the logically inverted form of the selected smaller element according to the logical polarity of the selected digit of the binary polynomial, until each ordered binary digit of the binary polynomial has been selected.

2. The method, according to claim 1, wherein said rearranging of said ordered sequence of binary message digits includes the steps of assembling said ordered binary digits as the sequential elements of sequential rows of a matrix and taking the ordered elements of sequential columns of said matrix as said re-ordered sequence.

3. The method, according to claim 2, wherein said method includes the step of taking, as said smaller elements, the sequences of said message binary digits in each of said columns of said matrix.

4. The method, according to claim 1, wherein said preferred binary polynomial is a PN sequence.

5. The method, according to claim 1, wherein said preferred binary polynomial is an m-sequence.

6. The method, according to claim 1, wherein said preferred binary polynomial comprises alternating binary digits of mutually inverse logical polarity.

7. The method, according to claim 1, comprising the steps of employing, as said digital message a first digital message, indicative of an alternative binary polynomial, transmitting said first digital message using said preferred polynomial, and, thereafter, transmitting a second binary message using said alternative binary polynomial.

8. The method, according to claim 7, wherein said alternative binary polynomial is a selectable one from a predetermined plurality of alternative binary polynomials.

9. The method, according to claim 7, wherein said alternative binary polynomial is a PN sequence.

10. The method, according to claim 7, wherein said alternative binary polynomial is an m-sequence.

11. The method, according to claim 7 wherein said alternative binary polynomial comprises alternating binary digits of mutually inverse logical polarity.

12. The method, for receiving a digital message, for use in conjunction with the method recited in claim 1, comprising the steps of; receiving said sequence of binary signals; employing the sequence of binary terms of said preferred polynomial to separate said sequence of binary signals into a plurality of supposedly identical smaller elements; correcting any errors between said plurality of supposedly identical smaller elements to create a corrected smaller element; assembling all of said plurality of smaller elements as a plurality of said smaller corrected elements into said re-ordered sequence; and deriving said ordered sequence from said re-ordered sequence.

13. The method, according to claim 12 wherein derivation of said ordered sequence from said re-ordered sequence comprises the steps of assembling said re-ordered binary digits as the sequential elements of sequential columns of a matrix and taking the ordered elements of sequential rows of said matrix as said ordered sequence.

14. The method, according to claim 13, comprising the step of taking, as said smaller elements, the sequences of said message binary digits in each of said columns of said matrix.

15. The method, according to claim 12, wherein said preferred binary polynomial is a PN sequence.

16. The method, according to claim 12, wherein said preferred binary polynomial is an m-sequence.

17. The method, according to claim 12, wherein said preferred binary polynomial comprises alternating binary digits of mutually inverse logical polarity.

18. The method, according to claim 12, for use where said digital message comprises a first digital message, indicative of an alternative binary polynomial, and a second digital message; said method comprising the steps of: recovering said first digital message using said preferred polynomial, recognizing said alternative binary polynomial and, thereafter, recovering a second binary message using said alternative binary polynomial.

19. The method, according to claim 18, wherein said alternative binary polynomial is a selectable one from a predetermined plurality of alternative binary polynomials.

20. The method, according to claim 19, wherein said alternative binary polynomial is a PN sequence.

21. The method, according to claim 19, wherein said alternative binary polynomial is an m-sequence.

22. The method, according to claim 19 wherein said alternative binary polynomial comprises alternating binary digits of mutually inverse logical polarity.

23. The method, according to claim 1, comprising the steps of; receiving said sequence of binary signals; employing the sequence of binary terms of said preferred polynomial to separate said sequence of binary signals into a plurality of supposedly identical smaller elements; correcting any errors between said plurality of supposedly identical smaller elements to create a corrected smaller element; assembling all of said plurality of smaller elements as a plurality of said smaller corrected elements into said re-ordered sequence; and deriving said ordered sequence from said re-ordered sequence.

24. Apparatus for transmitting a digital message, said digital message comprising an ordered sequence of binary message digits, apparatus being operative to rearrange said ordered sequence of binary message digits into a re-ordered sequence where no binary message digit in said re-ordered sequence is adjacent to any binary message digit whereto it was adjacent in said ordered sequence; wherein said apparatus is operative to divide said re-ordered sequence into a plurality of smaller elements; wherein said apparatus is operative to select each of said smaller elements, in turn; and repeatedly to transmit each selected smaller element, according to sequentially ordered digits of a preferred binary polynomial, selecting each ordered binary digit in said binary polynomial in turn, and selectively, as an ordered sequence of binary signals, transmitting either the logically uninverted form or the logically inverted form of the selected smaller element according to the logical polarity of the selected digit of the binary polynomial, until each ordered binary digit of the binary polynomial has been selected.

25. The apparatus for receiving a digital message, for use n conjunction with apparatus as recited in claim 24, operative to receive said sequence of binary signals; operative to employ the sequence of binary terms of said preferred polynomial to separate said sequence of binary signals into a plurality of supposedly identical smaller elements; operative to correct any errors between said plurality of supposedly identical smaller elements to create a corrected smaller element; operative to assemble all of said plurality of smaller elements as a plurality of said smaller corrected elements into said re-ordered sequence; and operative to deriving said ordered sequence from said re-ordered sequence.

26. Apparatus for communicating a digital message, said digital message comprising an ordered sequence of binary message digits, said apparatus being operative to rearrange said ordered sequence of binary message digits into a re-ordered sequence where no binary message digit in said re-ordered sequence is adjacent to any binary message digit whereto it was adjacent in said ordered sequence; wherein said apparatus is operative to divide said re-ordered sequence into a plurality of smaller elements; wherein said apparatus is operative to select each of said smaller elements, in turn; and repeatedly to transmit each selected smaller element, according to sequentially ordered digits of a preferred binary polynomial, selecting each ordered binary digit in said binary polynomial in turn, and selectively, as an ordered sequence of binary signals, transmitting either the logically uninverted form or the logically inverted form of the selected smaller element according to the logical polarity of the selected digit of the binary polynomial, until each ordered binary digit of the binary polynomial has been selected.

27. The apparatus, according to claim 26, operative to rearrange said ordered sequence of binary message digits by assembling said ordered binary digits as the sequential elements of sequential rows of a matrix and by taking the ordered elements of sequential columns of said matrix as said re-ordered sequence.

28. The apparatus for according to claim 26, operative to receive said sequence of binary signals; operative to employ the sequence of binary terms of said preferred polynomial to separate said sequence of binary signals into a plurality of supposedly identical smaller elements; operative to correct any errors between said plurality of supposedly identical smaller elements to create a corrected smaller element; operative to assemble all of said plurality of smaller elements as a plurality of said smaller corrected elements into said re-ordered sequence; and operative to deriving said ordered sequence from said re-ordered sequence.

29. A transmittable message, for conveyance by a medium, for conveying a digital message, said digital message comprising an ordered sequence of binary message digits, said digital message being prepared by a method comprising the steps of: rearranging said ordered sequence of binary message digits into a re-ordered sequence where no binary message digit in said re-ordered sequence is adjacent to any binary message digit whereto it was adjacent in said ordered sequence; dividing said re-ordered sequence into a plurality of smaller elements; selecting each of said smaller elements, in turn; and repeatedly transmitting each selected smaller element, according to sequentially ordered digits of a preferred binary polynomial, selecting each ordered binary digit in said binary polynomial in turn, and selectively, as an ordered sequence of binary signals, transmitting either the logically uninverted form or the logically inverted form of the selected smaller element according to the logical polarity of the selected digit of the binary polynomial, until each ordered binary digit of the binary polynomial has been selected.

* * * * *